United States Patent
Bernard et al.

(10) Patent No.: US 8,128,438 B2
(45) Date of Patent: Mar. 6, 2012

(54) DEVICE HAVING A HOUSING WITH A DRAINAGE OPENING AND AN ELONGATED TERMINAL PASSING THROUGH AN INSULATING INTERFACE FOR CONNECTING A SERVOMOTOR TO AN ELECTRICAL CABLE

(75) Inventors: Etienne Bernard, Paris (FR); Gilles Aubert-Maguero, Paris (FR)

(73) Assignee: Bernard Controls, Gonesse (FR)

( * ) Notice: Subject to any disclaimer, the term of this patent is extended or adjusted under 35 U.S.C. 154(b) by 0 days.

(21) Appl. No.: 13/055,466

(22) PCT Filed: Nov. 23, 2009

(86) PCT No.: PCT/FR2009/052247
§ 371 (c)(1),
(2), (4) Date: Feb. 4, 2011

(87) PCT Pub. No.: WO2010/061104
PCT Pub. Date: Jun. 3, 2010

(65) Prior Publication Data
US 2011/0117789 A1 May 19, 2011

(30) Foreign Application Priority Data
Nov. 28, 2008 (FR) ...................... 08 58079

(51) Int. Cl.
*H01R 13/502* (2006.01)
(52) U.S. Cl. ...................................... 439/701
(58) Field of Classification Search .................. 439/701, 439/660, 281, 582; 310/88
See application file for complete search history.

(56) References Cited

U.S. PATENT DOCUMENTS

| 4,491,754 | A |   | 1/1985 | Gotoh |
| 4,518,886 | A |   | 5/1985 | Kaneyuki |
| 5,006,742 | A |   | 4/1991 | Strobl et al. |
| 5,045,736 | A |   | 9/1991 | Amano et al. |
| 5,268,606 | A | * | 12/1993 | Adam et al. ............... 310/88 |
| 5,580,266 | A | * | 12/1996 | Shelly ..................... 439/281 |
| 5,872,410 | A |   | 2/1999 | Sudoff |
| 6,969,284 | B2 | * | 11/2005 | Singer et al. ............. 439/701 |

FOREIGN PATENT DOCUMENTS

| DE | 32 06 071 A1 | 10/1982 |
| DE | 33 05 297 A1 | 8/1984 |
| DE | 295 21 213 U1 | 2/1997 |
| DE | 201 09 298 U | 11/2002 |
| DE | 10 2006 033 186 A1 | 1/2008 |
| EP | 433 247 A1 | 6/1991 |
| EP | 536 441 A1 | 4/1993 |
| EP | 655 822 A1 | 5/1995 |

* cited by examiner

*Primary Examiner* — Chandrika Prasad
(74) *Attorney, Agent, or Firm* — Leydig, Voit & Mayer, Ltd.

(57) ABSTRACT

A device for connecting a servomotor to at least one electrical cable includes an external housing with at least one cable input, blocked by the cable in operation, and an opening closed by an electrical connection element and forming an interface with the servomotor. The electrical connection element includes a wall of an insulating material and elongate electrical contacts that extend through the wall in a direction substantially orthogonal to the wall, each electrical contact including an inner end inside the device for connection to an electrical cable, and outer end outside the device for being connecting to a corresponding electrical contact of the servomotor. The external housing includes an opening for draining fluid from inside the device in the operational configuration device, and the wall of the electrical connection element extends along a portion of the inner end of the electrical contacts.

7 Claims, 2 Drawing Sheets

Figure 1:
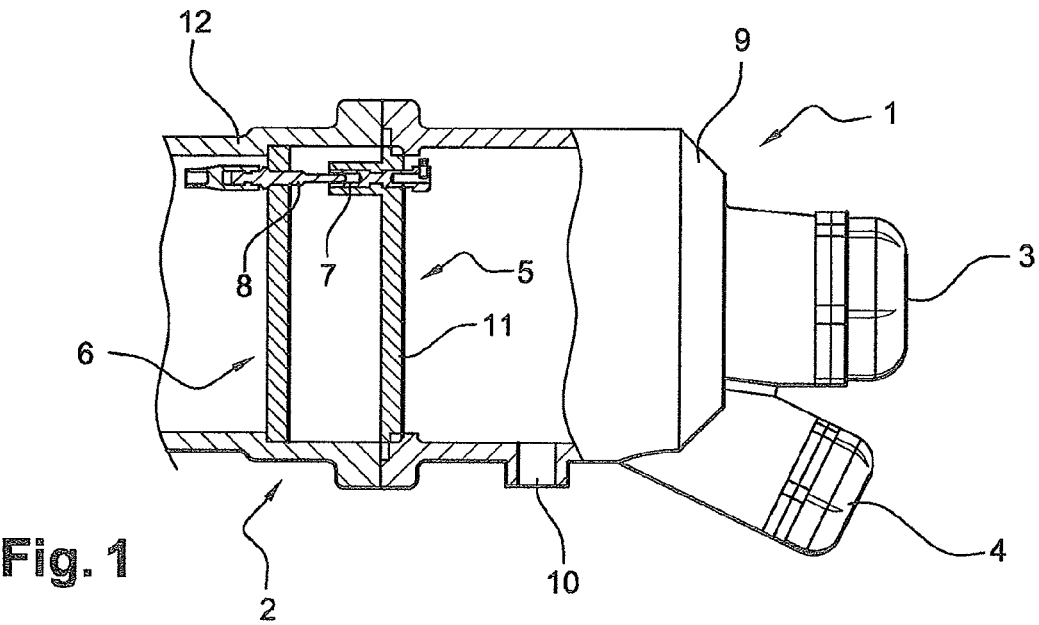

DEVICE HAVING A HOUSING WITH A DRAINAGE OPENING AND AN ELONGATED TERMINAL PASSING THROUGH AN INSULATING INTERFACE FOR CONNECTING A SERVOMOTOR TO AN ELECTRICAL CABLE

FIELD OF THE INVENTION

The present invention relates to a device for connecting a servomotor to at least one electrical cable. It also relates to a servomotor provided with such a device.

BACKGROUND

A servomotor is designed to generate a precise movement of a mechanical component, for example an industrial valve, according to an external control. A servomotor is thus a motorized system capable of achieving predetermined positions, then maintaining them. The position is, in the case of a rotary servomotor, a corner position, and, in the case of a linear servomotor, a distance position. The start-up and preservation of the predetermined position are controlled by the external control via at least one electrical cable.

To connect the servomotor to the cable, it is known to use a connector. A connector for this type of application typically comprises at least one cable input, as well as an opening intended to be closed by an electrical connection element suitable for being connected to the servomotor.

In certain cases, for example in the case of an incident in a nuclear power plant, the servomotor can be located in a high steam pressurized housing. Due to the pressure gradient between the outside and the inside of the connector, steam risks penetrating the cable and migrating through the sheath of the cable to the inside of the connector and then penetrating the servomotor, which risks greatly damaging the electrical equipment of the servomotor.

One known solution for preventing this steam migration consists of pouring resin in the connector, as well as inside the sheath of the cable, so as to submerge the wires of the cable in the resin.

This technique is, however, difficult to implement and is very expensive. Moreover, due to the presence of the resin, it becomes impossible to intervene in the cable.

The invention aims to resolve these drawbacks.

SUMMARY OF THE INVENTION

The invention proposes a device for connecting a servomotor to at least one electrical cable, making it possible to greatly limit the migration of liquid from the sheath of the cable towards the connecting device, the connecting device being simple and cost-effective to produce.

The invention thus relates to a device for connecting a servomotor to at least one electrical cable, the device comprising an external housing with at least one cable input, blocked by the cable in the operational configuration of the device, and an opening intended to be closed by an electrical connection element forming an interface with the servomotor, the electrical connection element consisting of a wall made from an insulating material and provided with elongate electrical contacts that extend through the wall in a direction substantially orthogonal to the wall, each electrical contact including one end inside the device suitable for being connected to an electrical cable, an end outside the device capable of being connected to a corresponding electrical contact of the servomotor.

In the device according to the invention, the external housing includes an opening for draining fluid from inside the device in the operational configuration of the device, and the wall of the electrical connection element extends along a portion of the inner end of the electrical contacts.

The presence of the fluid drain opening in the external housing enables an instantaneous pressure balancing between the outside and the inside of the connection device, which limits the risks of steam migration from the sheath of the cable to the inside of the device.

Moreover, the particular arrangement of the wall makes it possible to increase the travel distance of the electrical current between the electric contacts.

In order to reinforce the sealing of the device, each electrical contact can comprise an intermediate portion situated between the inner end and the upper end and provided with an annular slot, and said wall extends so as to fill in said slots.

To also increase the travel distance, at least one separating element protruding from the wall of the metal connection element can be positioned between inner ends of electrical contacts.

The outer end of the electrical contacts of the device can constitute a female plug, suitable for being connected to a male plug of the corresponding electrical contact of the servomotor.

The female plug can be surrounded by a coaxial element made from an insulating material, which improves the electrical insulation thereof.

The external housing can comprise a power cable input and a data transfer cable input.

The invention also relates to a servomotor connected to a device described above.

The invention lastly relates to the use of such a servomotor in a nuclear power plant.

BRIEF DESCRIPTION OF DRAWING FIGURES

Other aims, features and advantages of the invention will appear upon reading the following description, provided solely as a non-limiting example, and done in reference to the appended drawings, in which:

FIG. 1 diagrammatically illustrates a device according to the invention, connected to a servomotor, FIGS. 2 to 5 are detailed views of certain parts of the device and the servomotor.

DETAILED DESCRIPTION

As illustrated in 1, the connection device 1 according to the invention is connected to a servomotor 2. The device 1 comprises an external housing 9 comprising two cable inputs 3, 4. The input 3 is for example suitable for receiving a power cable of the motor, while the input 4 is suitable for receiving a data transfer cable. Although two cables 3, 4 are shown, the device 1 can comprise only one input, suitable for receiving either of the electrical cables. The inputs 3, 4 are advantageously provided with a cable gland in order to ensure sealing between the cable and the input 3, 4.

The device 1 also comprises a sealed electrical connection element 5, for example in the form of a plate, made primarily from plastic material, suitable for being connected to an electrical connection element 6, for example in the form of a plate, of the servomotor 2. The electrical connection element 6 is connected to an external housing 12 of the servomotor 2.

The connection element 5 comprises a wall 11 and electrical contacts 7 extending through the wall 11. The electrical contacts 7 are intended to receive electrical wires coming from the electrical cable(s) and to connect them to the corresponding electrical contacts 8 of the electrical connection element 6 of the servomotor 2.

According to the invention, the external housing 9 of the device 1 comprises an opening 10, positioned in the lower area of the external housing 9 in the operational configuration of the device 1 and making it possible to drain liquid in the event liquid is present in the device 1. For example, in the case of a nuclear accident, water can penetrate inside the device 1 coming from the electrical cable(s). During the accident, the steam pressure increases abruptly, but the opening 10 enables an instantaneous pressure balancing between the outside and the inside of the device 1, which limits the steam migration from the cable(s) towards the device 1. Indeed, if there was no opening 10, the inside of the device 1 would be at atmospheric pressure, which would promote the steam migration towards the inside of the device 1 due to the large pressure deviation between the outside and the inside of the device 1.

If steam penetrates the device 1 via the opening 10, the steam will condensate inside the device 1. The water thus formed then flows towards the outside of the device via the opening 10.

Figure 2:
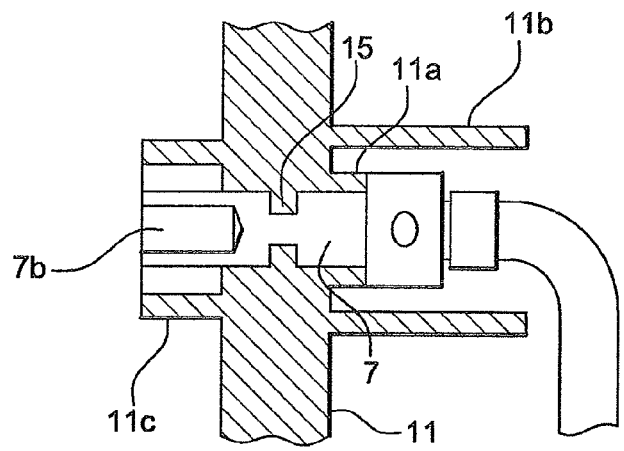
Figure 3:
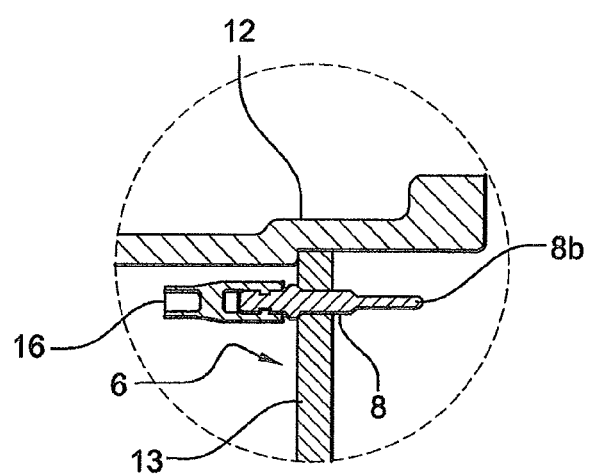

FIGS. 2 and 3 are detailed views of the electrical contacts 7 and 8 respectively. The electrical contact 7 is longitudinal and extends in a direction substantially orthogonal to the wall 11 of the electrical connection element 5. The contact 7 comprises an end inside the device comprising an inner orifice, not shown, and an outer end of the device comprising an outer orifice 7b. The inner and outer orifices 7b are made in a substantially cylindrical metal portion of the electrical contact 7. The metal portion is surrounded by plastic material of the wall 11.

The inner orifice is made on the inner side of the device 1. A wire coming from the power cable is introduced into the inner orifice and is fastened to the contact 7 by gripping using a screw. The orifice 7b is made on the outer side of the device 1. The orifice 7b constitutes a female contact in which a corresponding male contact 8b of the connection element 6 of the servomotor 2 is introduced. The orifice 7b is surrounded by a coaxial element 11c made from a plastic material.

To reinforce the sealing between the inner orifice and the outer orifice 7b of the wall 11, the electrical contact 7 advantageously comprises a slot 15, situated between the inner end and the outer end of the electrical contact 7, and preferably positioned on the entire perimeter of the metal portion 7, in the form of a groove 15. During molding of the plastic material of the wall 11, the shrinking leads to an expansion of material longitudinally and radially relative to the axis of the electric contact 7. Owing to the presence of the groove 15, the plastic material bears on faces perpendicular to the axis of the contact 7. The groove 15 thus formed is filled with plastic material and ensures sealing of the wall 11, even after shrinking.

It is also possible, to reinforce the sealing, to position a sheath, for example a thermoshrinkable sheath, on the wires coming from the cable and on the inner end of the contacts 7. The device 1 can also be filled with a filling material, advantageously a resin. The filling can be done using a filling opening, not shown, positioned in the external housing 9 of the device 1.

The wall 11 extends, via a portion 11a, over a portion of the inner end of the electrical contact 7. In this way, the travel distance of the electrical current between two electrical contacts 7 is increased. Subsequently, the electrical insulation distance between the electrical contacts 7 is increased.

Moreover, a separating element 11b protruding from the wall 11 is intended to increase the travel distance of the electrical current between the electrical contacts 7.

The electrical contact element 6, as illustrated in 3, comprises a wall 13 and metal electrical contacts 8 positioned substantially orthogonal to the wall 13, and extending on either side of the wall 13. Each electrical contact 8 comprises, on the side of the connection device 1, a male contact 8b suitable for being introduced into a corresponding female contact 7b of the electrical connection element 5 of the device 1. To facilitate the insertion of the male contacts 8b into the female contacts 7b, the male contacts 8b are in floating contact with the wall 13 of the electrical connection element 6. The internal connection to the servomotor 2 is done using connection elements 16, for example cylindrical lugs, with or without insulation, that are for example plugged in or clipped on the inner end of the electrical contacts 8.

Figure 4:
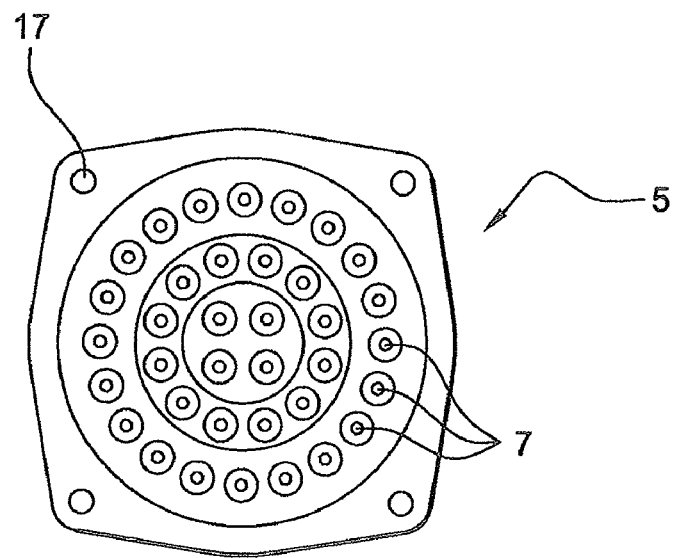

FIG. 4 is a front view of the electrical connection element 5. The electrical connection element 5 comprises three concentric rows of electrical contacts 7. The two external rows of electrical contacts 7 are intended to transmit data from the servomotor 2 to an external command, in particular data concerning the position of the mechanical element actuated by the servomotor 2 and/or data concerning the torque applied to the mechanical element. The inner row of electrical contacts 7 comprises three contacts 7 intended to power a triphase motor, as well as an electrical contact 7 intended to be grounded. The electrical connection element 5 also comprises orifices 17 for fastening the electrical connection element 5 by screwing on the external housing 9 of the device 1.

Figure 5:
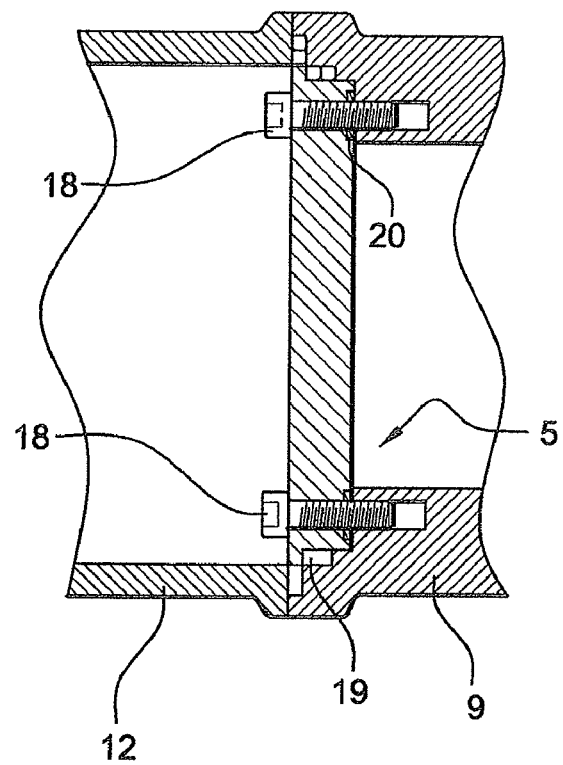

FIG. 5 illustrates the fastening of the electrical connection element 5 to the external housing 9 of the device 1. After connecting the electrical cables to the electrical connection element 5, the latter part is fastened to the housing 9 using screws 18, with o-ring seals 19, 20. The device 1 is then connected to the electrical connection element 6 of the servomotor 2. A mistake-proofer ensured by the shape of the electrical connection element 5 advantageously prohibits any incorrect assembly. Lastly, the external housing 9 of the device 1 is screwed to the external housing 12 of the servomotor 2.

The invention claimed is:

1. A device for connecting a servomotor to at least one electrical cable, the device comprising:
    an external housing with at least one cable input blocked by the cable in an operational configuration of the device, and an opening closeable by an electrical connection element forming an interface with the servomotor, wherein
    the electrical connection element including a wall of an insulating material and including elongate electrical contacts that extend through the wall in a direction substantially orthogonal to the wall,
    each electrical contact includes an inner end inside the device for connection to an electrical cable, and an outer end connectable to a corresponding electrical contact of the servomotor,
    the external housing comprises an opening for draining fluid from inside the device in the operational configuration of the device, and
    the electrical connection element has a wall extending over part of the inner end of the electrical contacts.

2. The device according to claim 1, wherein
    each electrical contact comprises an intermediate portion situated between the outer end and the upper end and including an annular slot, and
    the wall extends to fill in the slots.

3. The device according to claim 1 including at least one separating element protruding from the wall of the electrical connection element.

4. The device according to claim 1, wherein the outer end of the electrical contacts of the device constitutes a female plug, connectable to a male plug of a corresponding electrical contact of the servomotor.

5. The device according to claim 4, wherein the female plug is surrounded by a coaxial element of the insulating material.

6. The device according to claim 1, wherein the external housing comprises a power cable input and a data transfer cable input.

7. The device according to claim 1 connected to the servomotor.

* * * * *